(12) United States Patent
Evans et al.

(10) Patent No.: US 6,320,592 B1
(45) Date of Patent: *Nov. 20, 2001

(54) METHOD AND APPARATUS FOR SEPARATING IMAGE DATA FROM A COLOR SYSTEM IN IMAGE PROCESSING

(75) Inventors: Jerald Evans, Mountain View; James Graham, Sunnyvale; Jeannette Hung, Redwood City, all of CA (US)

(73) Assignee: Sun Microsystems, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/885,616

(22) Filed: Jun. 30, 1997

(51) Int. Cl.$^7$ .................................................. G06T 1/00
(52) U.S. Cl. .......................... 345/600; 345/546; 345/550; 345/543
(58) Field of Search ...................... 345/199, 153, 345/511, 508, 431, 186, 510, 600, 546, 550, 543

(56) References Cited

U.S. PATENT DOCUMENTS

| | | |
|---|---|---|
| 5,291,585 | 3/1994 | Sato et al. . |
| 5,295,245 * | 3/1994 | Alcorn ................................. 345/518 |
| 5,327,562 * | 7/1994 | Adcock ................................. 395/708 |
| 5,334,996 * | 8/1994 | Tanigank et al. ..................... 345/152 |
| 5,335,320 | 8/1994 | Iwata et al. . |
| 5,343,220 * | 8/1994 | Veasy ................................... 345/179 |
| 5,345,550 | 9/1994 | Bloomfield . |
| 5,347,627 | 9/1994 | Hoffmann et al. . |
| 5,359,342 * | 10/1994 | Nakai ................................... 345/199 |
| 5,384,911 | 1/1995 | Bloomfield . |
| 5,404,448 * | 4/1995 | Bowen ................................. 345/507 |
| 5,412,772 | 5/1995 | Monson . |
| 5,414,806 | 5/1995 | Richards . |

(List continued on next page.)

OTHER PUBLICATIONS

Andrew Clayton and Fulton, Nancy, "3D Studio Max Applied", Advanstar, pp. 125–153&200–211, 1996.*

*Primary Examiner*—Raymond J. Bayerl
*Assistant Examiner*—Thomas J Joseph
(74) *Attorney, Agent, or Firm*—The Hecker Law Group

(57) ABSTRACT

Raw image data is separated from color image data such that image data can be operated on independent of a color model. Alternatively, image data can be associated with a color model and image processing operations can operate on the image data in terms of the color model. No color model is presupposed for a given image. When an image processing operation uses a color system, a color system can be selected in which the operation is performed and the source image will be converted. Different color systems can be associated with the same image data to process the image. Where it is not necessary to perform an image processing operation in a color system, the operation can access the image data independent of a color system. In an embodiment of the invention, a Tile object class is comprised of an array of Channel objects. A Channel object is associated with one or more storage bands of image data. A ColorModel object class identifies a color system and specifies a mapping between the raw image data and the color and alpha components of a color system. A BufferedImage object class is defined that associates a ColorModel with a Tile. BufferedImageOp and TileOp interfaces are defined in embodiments of the invention that are implemented by image processing or filtering object classes. A BufferedImageOp interface is used for filtering operations performed within a color system. Filtering operations that are performed outside a color system use the TileOp interface.

31 Claims, 5 Drawing Sheets

U.S. PATENT DOCUMENTS

| | | |
|---|---|---|
| 5,423,034 | 6/1995 | Cohen-Levy et al. . |
| 5,430,836 | 7/1995 | Wolf et al. . |
| 5,436,637 | 7/1995 | Gayraud et al. . |
| 5,448,695 | 9/1995 | Douglas et al. . |
| 5,461,399 | 10/1995 | Cragun . |
| 5,461,710 | 10/1995 | Bloomfiled et al. . |
| 5,473,745 | 12/1995 | Berry et al. . |
| 5,491,784 | 2/1996 | Douglas et al. . |
| 5,493,638 | 2/1996 | Hooper et al. . |
| 5,509,116 | 4/1996 | Hiraga et al. . |
| 5,526,517 | 6/1996 | Jones et al. . |
| 5,544,288 | 8/1996 | Morgan et al. . |
| 5,546,519 | 8/1996 | Berry . |
| 5,548,702 | 8/1996 | Li et al. . |
| 5,550,968 | 8/1996 | Miller et al. . |
| 5,555,354 * | 9/1996 | Strasnick et al. ............ 395/127 |
| 5,559,942 | 9/1996 | Gough et al. . |
| 5,564,003 | 10/1996 | Bell et al. . |
| 5,566,330 | 10/1996 | Sheffield . |
| 5,570,462 | 10/1996 | McFarland . |
| 5,572,643 | 11/1996 | Judson . |
| 5,581,761 | 12/1996 | Radia et al. . |
| 5,623,590 * | 4/1997 | Becker et al. .......... 345/326 |
| 5,638,523 * | 6/1997 | Mullet ................ 345/326 |
| 5,694,603 | 12/1997 | Reiffin . |
| 5,694,604 | 12/1997 | Reiffin . |
| 5,719,598 * | 2/1998 | Latham ................ 345/419 |
| 5,737,553 * | 4/1998 | Bartok ................ 345/339 |
| 5,850,531 * | 12/1998 | Cox et al. ............ 345/349 |
| 5,862,253 * | 1/1999 | Schuneman .......... 382/162 |
| 5,900,860 * | 5/1999 | Ueda ................ 345/150 |
| 5,940,067 * | 8/1999 | Greene ................ 345/199 |
| 5,959,618 * | 9/1999 | Wantanabe .......... 345/199 |
| 5,995,106 * | 11/1999 | Naughton et al. .......... 345/357 |
| 6,025,885 * | 2/2000 | Deter ................ 348/661 |
| 6,031,517 * | 2/2000 | Van Ness ............ 345/150 |
| 6,075,530 * | 6/2000 | Lucas et al. .......... 345/339 |
| 6,243,094 * | 6/2001 | Skar ................ 345/356 |

\* cited by examiner

METHOD AND APPARATUS FOR SEPARATING IMAGE DATA FROM A COLOR SYSTEM IN IMAGE PROCESSING

BACKGROUND OF THE INVENTION

1. Field of the Invention

This invention relates to the fields of graphics, image processing and object-oriented programming. More particularly, the invention relates to a method and apparatus for separating image data from an image's color system.

2. Background Art

In a computer system, a graphic image is typically comprised of a plurality of individual pixels. Each pixel is assigned a data value that defines the color of a pixel according to a particular color system associated with an image. A color system provides a mechanism for specifying color, and chromaticity, associated with each pixel in the graphic image. A color system consists of a set of components that specify a color in the color system. Each component is assigned a numeric value to express a color. For example, the RGB (Red, Green, Blue) color system consists of red, green and blue components. Three data values are used to express the degree of red, green and blue contributions for each color in the RGB color system. Images are either tightly coupled to a color system such that image data cannot be manipulated independent of the image's color system, or images are expressed independent of its color system until the image is rendered thereby making it impossible to manipulate an image in its color system.

Current software image processing applications or programs do not facilitate manipulation of an image based on the requirements of each particular image processing operation. That is, current systems either always associate the color system with image data or always disregard the color system during image processing. This causes inefficiencies in processing in that certain operations are more efficient when performed in terms of a color system while others are more efficient when the color system is ignored. Where the color system is not necessary for the image processing operation, it is wasted overhead. Further, where the color system is unavailable to an image processing operation that uses the color system, unexpected and erroneous results can occur.

Two examples of prior art software image processing systems are the Microsoft Windows and X11 windowing systems. In these systems, an image is defined in terms of an RGB color system which is used to interpret pixel data as color. It is impossible to create an image in these windowing systems without first identifying which portions of pixel data represent which component of the RGB color system.

In X11, for example, an image may be expressed in the RGB color system using 24-bit image data. That is, the color data for each pixel is stored in 24 bits with each component of the RGB color system being represented in 8 bits. To manipulate an image data in X11, it is first necessary to define which set of 8 bits represents which component of the color system. For example, the first 8 bits of the 24-bit value associated with a pixel may be assigned to the red component, the next 8 bits to the blue component and the last 8 bits to the green component. Similarly, an image may be expressed in terms of the RGB color system in Microsoft Windows. That is, the image data represents components in a color system. The image data in the X11 and Windows systems cannot be operated upon independent of the color system.

In XIL version 1.2 (a cross-platform C language image processing foundation library containing low-level image manipulation operators developed by Sun Microsystems, Inc.), a mechanism for associating a color system with image data as the image data is being processed is recognized by only one function (i.e., xil_color_convert). Thus, for all other operations, it is necessary for the developer to be aware of what operation is being performed and the effect that the operation has on the image's color system. There is no general way, for example, for the developer to guarantee the effect that an operation will have on a component of the image's color system since the operation has no knowledge of the associations between the image data and components of a color system. In XIL version 1.3, a new mechanism to represent a color system is supported, but the color system data is maintained separately from the image data at all times.

Thus, in prior art image processing systems, the color system is either always tightly coupled to an image, or is always disassociated from the image during image processing operations. This is problematic in that some operations that are to be performed on an image use the color system while other image processing operations can be performed independent of the color system. Prior art systems have no mechanism for processing an image such that it is possible to reference the image in terms of or independent of its color system based on the requirements of the image processing operation.

There is nothing apparent in a particular image operation that indicates whether it operates on input that is tied to the color system. Thus, the developer of an image processing application must be aware of which image processing operations use the color system (e.g., a color conversion) and which operations do not (e.g., rotation). Further, certain operations may be performed more efficiently with a particular color system. Therefore, there are inefficiencies in forcing the developer into a particular color system to process an image. However, as previously discussed, there are drawbacks to having a system in which the image is processed using operations that do not take the color system into account.

In summary, current software image processing applications either tightly couple the color system with the image or disregard the color system during image processing. This causes inefficiencies in processing and causes erroneous results.

SUMMARY OF THE INVENTION

According to one or more embodiments of the invention, raw image data is separated from the color system used to interpret the image data. Accordingly, for certain image processing operations, image data can be operated on independently of a color system (a technique for specifying colors such as describing a color in terms of red, green and blue components or cyan, magenta, yellow, and black components). Alternatively, image data can be associated with a color system and image processing operations can operate on the image data in terms of the color system.

No color system is presupposed for a given image. When an image processing operation uses a color system, a color system can be selected according to which the operation is performed. Different color systems can be associated with the same image data for different processing operations. For example, a color system may be chosen for performing an operation that allows the operation to be performed more efficiently. Where it is not necessary to perform an image processing operation using a color system, the operation can access the image data independent of any color system.

In an embodiment of the invention, a Tile object class is comprised of an array of Channel objects. A Channel object is associated with one or more bands of image data. A ColorModel object class identifies a color system and specifies a mapping between the raw image data and the color and alpha components of a color system. A BufferedImage object class is defined that associates a ColorModel with a Tile.

According to one or more embodiments of the invention, a color image is generated from raw image data via the BufferedImage object that combines the raw data associated with a Tile object with a ColorModel used to interpret the raw data in terms of a color system. A ColorModel interprets the color meaning of the data such that it is possible to determine which band from the raw data represents which color component of a color system. For example, in the RGB color system, the ColorModel indicates which band or channel of data represents the red component, the green component and the blue component.

An image processing operation that operates on the raw data outside (or independent of) a color system can access the data via the Tile object. An image processing operation that operates within a color system can access the image data via the BufferedImage object. One or more classes of objects implement a filter method that operates on either a BufferedImage or a Tile.

An image operator performs the alterations specified by the particular filtering or image processing operation (e.g., amplitude, scaling, look-up table modification, linear channel combination, color conversion, and convolution). The filtering operation uses a source as input and produces a destination. When performing an operation within a color system, the source and destination are instances of the BufferedImage class. The source and destination are instances of the Tile class when the operation is performed outside of a color system.

Two interfaces are defined in embodiments of the invention that are implemented by image processing or filtering object classes. A BufferedImageOp interface is used for filtering operations performed within a color system. The BufferedImageOp interface includes a filter method that identifies a source and destination BufferedImage object. Filtering operations that are performed outside a color system use the TileOp interface. The TileOp interface includes a filter method that identifies a source and destination Tile object. An image filter is therefore aware of whether it is operating inside or outside a color system, and can provide either one or both of the BufferedImageOp and TileOp interfaces.

DETAILED DESCRIPTION OF THE INVENTION

A method and apparatus for separating image data from a color system in image processing is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Embodiment of Computer Execution Environment (Hardware)

Figure 1:
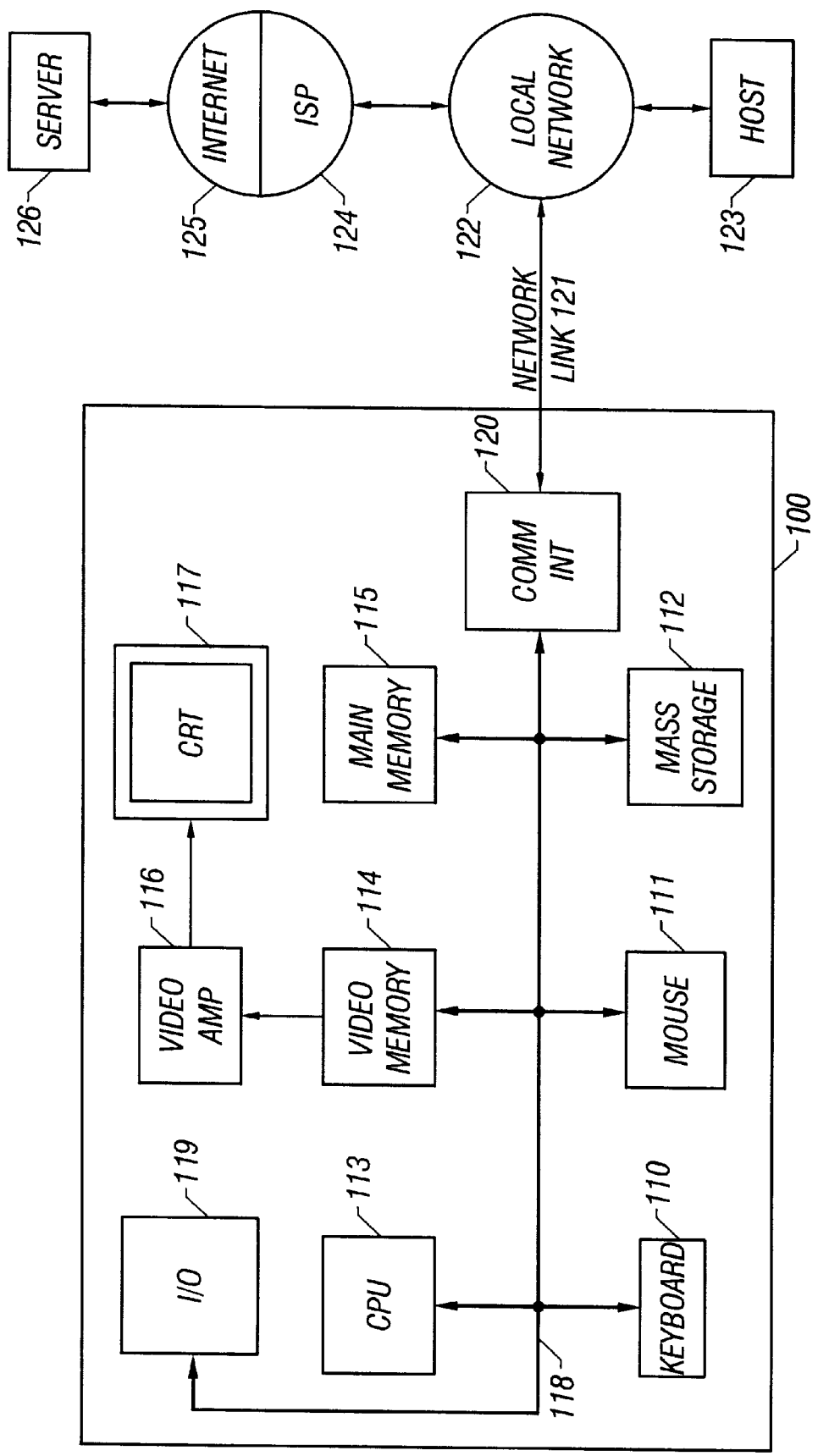
FIG. 1 provides an example of a general purpose computer that can be used in an embodiment of the invention.

An embodiment of the invention can be implemented as computer software in the form of computer readable program code executed on a general purpose computer such as computer 100 illustrated in FIG. 1. A keyboard 110 and mouse 111 are coupled to a bi-directional system bus 118. The keyboard and mouse are for introducing user input to the computer system and communicating that user input to central processing unit (CPU) 113. Other suitable input devices may be used in addition to, or in place of, the mouse 111 and keyboard 110. I/O (input/output) unit 119 coupled to bi-directional system bus 118 represents such I/O elements as a printer, A/V (audio/video) I/O, etc.

Computer 100 includes a video memory 114, main memory 115 and mass storage 112, all coupled to bidirectional system bus 118 along with keyboard 110, mouse 111 and CPU 113. The mass storage 112 may include both fixed and removable media, such as magnetic, optical or magnetic optical storage systems or any other available mass storage technology. Bus 118 may contain, for example, thirty-two address lines for addressing video memory 114 or main memory 115. The system bus 118 also includes, for example, a 32-bit data bus for transferring data between and among the components, such as CPU 113, main memory 115, video memory 114 and mass storage 112. Alternatively, multiplex data/address lines may be used instead of separate data and address lines.

In one embodiment of the invention, the CPU 113 is a microprocessor manufactured by Motorola, such as the 680X0 processor or a microprocessor manufactured by Intel, such as the 80X86, or Pentium processor, or a SPARC microprocessor from Sun Microsystems. However, any other suitable microprocessor or microcomputer may be utilized. Main memory 115 is comprised of dynamic random access memory (DRAM). Video memory 114 is a dual-ported video random access memory. One port of the video memory 114 is coupled to video amplifier 116. The video amplifier 116 is used to drive the cathode ray tube (CRT) raster monitor 117. Video amplifier 116 is well known in the art and may be implemented by any suitable apparatus. This circuitry converts pixel data stored in video memory 114 to a raster signal suitable for use by monitor 117. Monitor 117 is a type of monitor suitable for displaying graphic images.

Computer 100 may also include a communication interface 120 coupled to bus 118. Communication interface 120 provides a two-way data communication coupling via a network link 121 to a local network 122. For example, if communication interface 120 is an integrated services digital network (ISDN) card or a modem, communication interface 120 provides a data communication connection to the corresponding type of telephone line, which comprises part of network link 121. If communication interface 120 is a local area network (LAN) card, communication interface 120 provides a data communication connection via network link 121 to a compatible LAN. Wireless links are also possible.

In any such implementation, communication interface 120 sends and receives electrical, electromagnetic or optical signals which carry digital data streams representing various types of information.

Network link 121 typically provides data communication through one or more networks to other data devices. For example, network link 121 may provide a connection through local network 122 to host computer 123 or to data equipment operated by an Internet Service Provider (ISP) 124. ISP 124 in turn provides data communication services through the world wide packet data communication network now commonly referred to as the "Internet" 125. Local network 122 and Internet 125 both use electrical, electromagnetic or optical signals which carry digital data streams. The signals through the various networks and the signals on network link 121 and through communication interface 120, which carry the digital data to and from computer 100, are exemplary forms of carrier waves transporting the information.

Computer 100 can send messages and receive data, including program code, through the network(s), network link 121, and communication interface 120. In the Internet example, server 126 might transmit a requested code for an application program through Internet 125, ISP 124, local network 122 and communication interface 120. In accord with the invention, one such downloaded application is the separating image data from a color system in image processing described herein.

The received code may be executed by CPU 113 as it is received, and/or stored in mass storage 112, or other non-volatile storage for later execution. In this manner, computer 100 may obtain application code in the form of a carrier wave.

The computer system described above is for purposes of example only. An embodiment of the invention may be implemented in any type of computer system or programming or processing environment.

Internet and Object-Oriented Programming Environments

Image processing is of interest in the Internet or Intranet environments where an image can be transmitted to a client via the Internet (or Intranet). The Internet provides a connection between servers and clients. Using the Internet, a page of information can be relayed between a server and a client. A browser (e.g., Netscape's Navigator and Microsoft's Internet Explorer) receives a definition for the page and displays the page at the client's workstation. The page definition is written in a definitional language such as Hypertext Markup Language (HTML). If the page's definition identifies an image (e.g., the image is specified in the definition using its file name and, if necessary, a location), the browser retrieves the image and displays it at the client.

A page definition can further identify a program, referred to as an applet, that is invoked by the browser. An applet is written in a programming language such as Java. Java is a product of Sun Microsystems, Inc. When an applet is specified in a page definition, the browser reserves space in the browser's window for displaying the applet. A running copy of the applet is created, initialized, and started. The applet's paint routine is called to draw the applet in the browser window.

Java is an object-oriented programming language. Object-oriented programming is a method of creating computer programs by combining certain fundamental building blocks, and creating relationships among and between the building blocks. The building blocks in object-oriented programming systems are called "objects." An object is a programming unit that groups together a data structure (instance variables) and the operations (methods) that can use or affect that data. Thus, an object consists of data and one or more operations or procedures that can be performed on that data. The joining of data and operations into a unitary building block is called "encapsulation."

An object can be instructed to perform one of its methods when it receives a "message." A message is a command or instruction to the object to execute a certain method. It consists of a method selection (name) and a plurality of arguments that are sent to an object. A message tells the receiving object what operations to perform.

One advantage of object-oriented programming is the way in which methods are invoked. When a message is sent to an object, it is not necessary for the message to instruct the object how to perform a certain method. It is only necessary to request that the object execute the method. This greatly simplifies program development.

Object-oriented programming languages are predominantly based on a "class" scheme. The class-based object-oriented programming scheme is generally described in Lieberman, "Using Prototypical Objects to Implement Shared Behavior in Object-Oriented Systems," OOPSLA 86 Proceedings, September 1986, pp. 214–223.

A class defines a type of object that typically includes both instance variables and methods for the class. An object class is used to create a particular instance of an object. An instance of an object class includes the variables and methods defined for the class. Multiple instances of a the same class can created from an object class. Each instance that is created from the object class is said to be of the same type or class.

A hierarchy of classes can be defined such that an object class definition has one or more subclasses. A subclass inherits its parent's (and grandparent's etc.) definition. Each subclass in the hierarchy may add to or modify the behavior specified by its parent class.

To illustrate, an employee object class can include "name" and "salary" instance variables and a "set_salary" method. Instances of the employee object class can be created, or instantiated for each employee in an organization. Each object instance is said to be of type "employee." Each employee object instance includes the "name" and "salary" instance variables and the "set_salary" method. The values associated with the "name" and "salary" variables in each employee object instance contain the name and salary of an employee in the organization. A message can be sent to an employee's employee object instance to invoke the "set_salary" method to modify the employee's salary (i.e., the value associated with the "salary" variable in the employee's employee object).

An object is a generic term that is used in the object-oriented programming environment to refer to a module that contains related code and variables. A software program can be written using an object-oriented programming language whereby the program's functionality is implemented using objects.

Defining Images

In a two dimensional space, an image is a defined by a two dimensional array of pixel values. Each pixel value can be used to determine a color value for the pixel. For example, in an RGB color system, there is a red, green and blue component for each pixel. The term color system is used to refer generically to the various color specification techniques used to identify color in graphics imaging. The pixel value in an RGB color system includes three values that represent the degree of redness, greenness and blueness that contribute to the pixel's color. Thus, the values associated with a pixel are thought of as a representation of the color of the pixel. Alternatively, the values can be thought of as pieces of data without any notion of color.

Image processing operations fall into two categories: 1) operations performed within a color system (e.g., pixel data represents the pixel's color), and 2) operations that operate outside a color system (e.g., data does not represent color). For example, if a 90° rotate operation (which involves no interpolation) is being performed on an image, it is only necessary to move the values. It is immaterial to the rotation operation whether a piece of data that is being processed represents the degree of redness for a pixel. Thus, this rotate operation can be performed outside a color system. However, there are certain operations, such as a color conversion operation, where the identity of the piece of data within a color system is important to the operation. That is, it is important to know when performing a color conversion operation that the data that is being processed represents redness, for example. There is nothing inherent in an operation that identifies the category to which an operation belongs.

According to one or more embodiments of the invention, an object-oriented approach is taken to specify an image and clarify how data is being used in image processing operations. Image data is maintained separately from the mechanism that turns the raw data into a color. At any time while processing an image, the image data can be combined with a color system to generate a color image.

Figure 2:
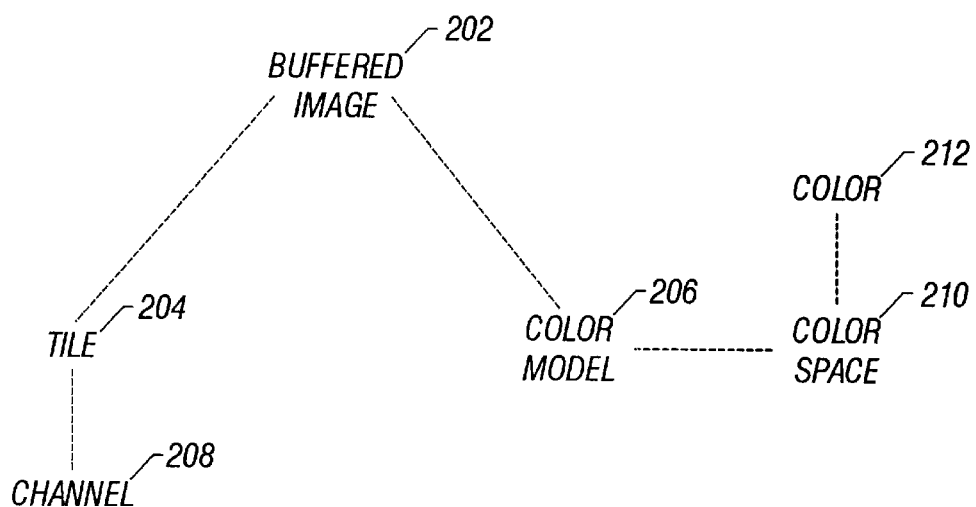
FIG. 2 provides an example of object classes used in embodiments of the invention.

FIG. 2 provides an example of object classes used in embodiments of the invention. BufferedImage class 202 represents an accessible buffer of image data. BufferedImage class 202 contains information regarding the image. For example, BufferedImage class 202 identifies the type of image and the height and width of the image. The image type can identify the layout of the image data such as the number of channels and the way in which the data is stored in the channels. In addition, the image type can specify a color system.

BufferedImage class 202 is associated with Tile class 204 and ColorModel class 206. Tile class 204 represents the image data as mere data independent of a color interpretation. Tile class 204 is associated with an array of objects instantiated from Channel class 208.

Channel class 208 is a collection of data (e.g., a data array) and data layout parameters for one storage band of an image. Channel class 208 describes how one storage band for a pixel is laid out in memory. The data array may include the data for one or more storage bands of information. The data array comprises one or more data array elements. Data that specifies a value for a given channel at a given x,y location of the image is referred to as a channel element. A data array element can contain one or more channel elements. A discrete channel contains one channel element per data array element. A packed channel contains one or more channel elements per data array element.

The data layout parameters for Channel class 208 include channel offset, pixel stride, scanline stride, and bit precision. Channel offset is an index into the channel data array in which the first element of the first scanline of this channel is stored. Pixel stride specifies the number of data array elements between two channel elements for the same channel on the same scanline. The scanline stride identifies the number of data array elements between a given channel element and the channel element in the same column of the next row.

ColorModel class 206 is used to interpret the image data in terms of color. ColorModel class 206 specifies the color system of the image data and how the data is mapped to color and alpha components. ColorModel class 206 is associated with Color Space 210.

Specific Colors 212 are represented in a color system specified by an instance of ColorSpace class 210. ColorSpace class 210 can further be used to identify the color system of an instance of BufferedImage class 202 via an instance of ColorModel class 206. ColorSpace class 210 contains methods that transform instances of Color class 212 in a specific color system to a default color system (e.g., default RGB or CIEXYZ color systems).

By separating image data from a color system, it is possible to represent different aspects of the same image data by, for example, selecting a subset of the bands of an image for association with a color system. In prior art methods, convenient and efficient access to an image was limited to the number of channels of data expected by the color system associated with an image. Thus, if a color system expected three channels of data, only three channels of data were used to define an image.

Figure 3:
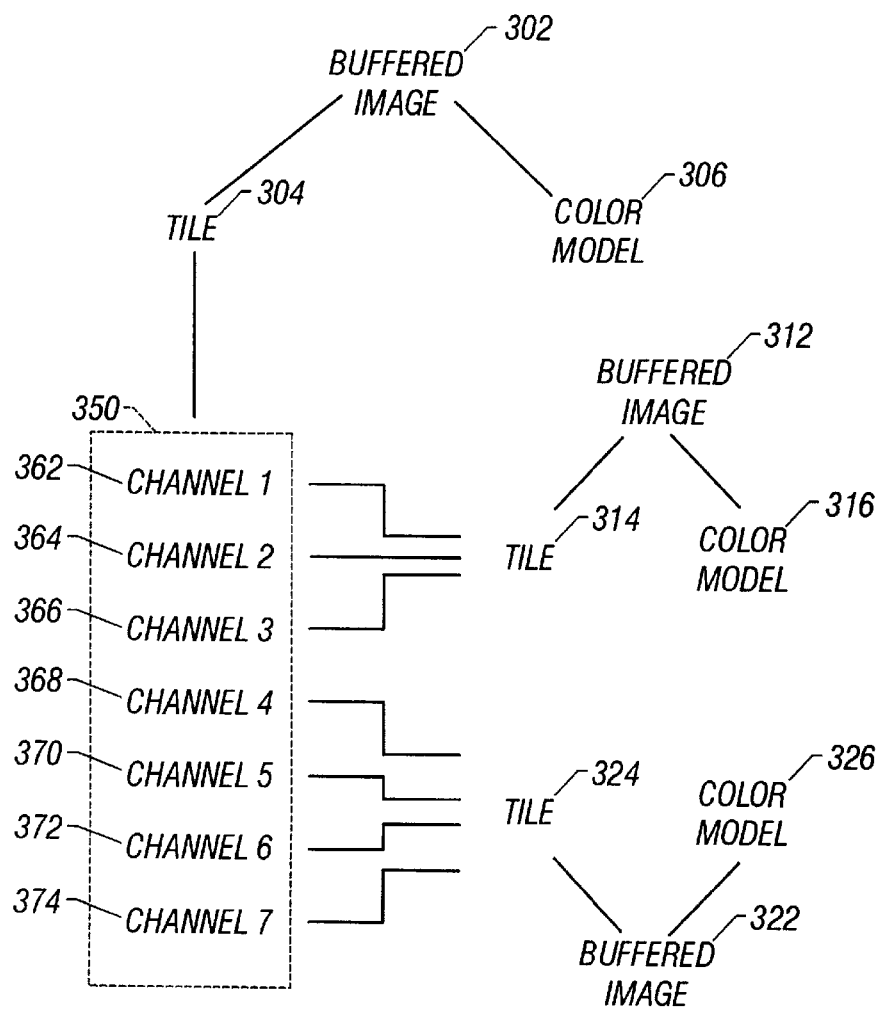
FIG. 3 provides an example of the use of an arbitrary number of channels according to an embodiment of the invention.

In embodiments of the invention, an arbitrary number of data channels can be associated with an image. That is, the number of channels of data is not limited by a specific color system thereby allowing the number of data channels associated with an image to exceed the number of channels expected by a color system. FIG. 3 provides an example of the use of an arbitrary number of channels according to an embodiment of the invention.

Data generated by a Landsat satellite image may have, for example, seven channels of data that correspond to the different sensors onboard the satellite. An instance of channel object 208 is instantiated for each channel of Landsat data (i.e., channels 362–374). Channels 362–374 are associated with an instance of Tile object 204 (i.e., Tile 304).

All seven channels can be used with a color system that expects seven channels. For example, an instance of ColorModel class 206, ColorModel 306, expects seven channels of image data. In this case, Tile 304 and ColorModel 306 are associated with an instance of BufferedImage class 202, BufferedImage 302. Operations can be performed on the data contained in Channels 362–374 via either Tile 304 (to perform operations outside the color system associated with ColorModel 306) or BufferedImage 302 (to perform color operations within the color system associated with ColorModel 306).

The image data in Channels 362–374 can also be grouped with a color system that expects fewer data channels. For example, an instance of ColorModel class 206 (i.e. ColorModel 316) expects three data channels. ColorModel 316 can be associated with an RGB color system, for example. To display the image using ColorModel 316, an instance of Tile class 204; Tile 314 is created to include three of the seven channels. In the RGB color system, the three channels map to red, green and blue color components. Any combination of three of the seven channels can be used to supply the image data. Channels 362, 364, and 366 are selected for use with ColorModel 316.

The same or different data channels can be associated with another color system. For example, ColorModel 326 is associated with a color system that expects four data channels such as the RGBA (i.e., red, green, blue and alpha components) or CMYK (i.e., cyan, magenta, yellow, and black) color systems. Channels 368, 370, 372, and 374 are associated with Tile 324. Tile 324 and ColorModel 316 are associated with BufferedImage 322.

Image processing operations can be within or outside a color system. An image processing operation that operates on the raw data outside (or independent of) a color system can access the data via the Tile object. An image processing operation that operates within a color system can access the image data via the BufferedImage object. One or more classes of objects implement a filter method that operates on either a BufferedImage or a Tile.

Figure 4:
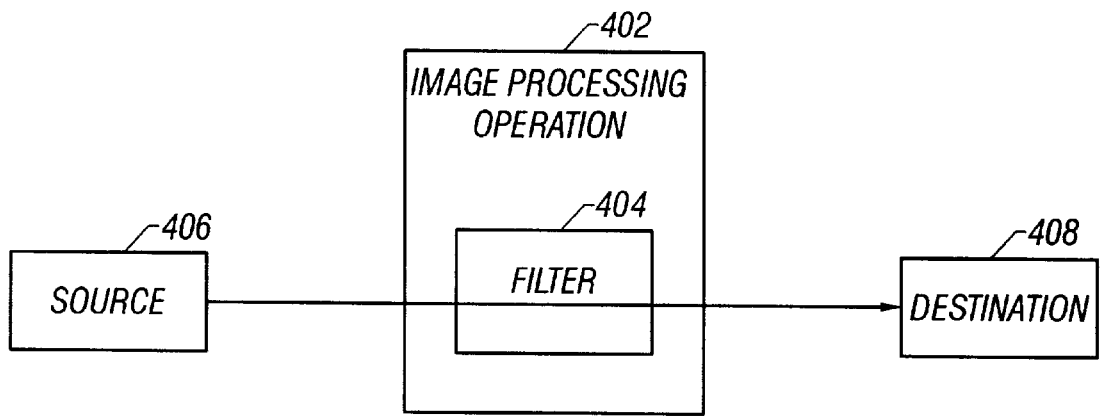
FIG. 4 provides an overview of an image processing operation according to an embodiment of the invention.

According to one or more embodiments of the invention, an image filtering design pattern is used in image processing operations. In image processing, an image filter performs the alterations specified by the particular image processing operation (e.g., amplitude, scaling, look-up table modification, linear channel combination, color conversion, and convolution). FIG. 4 provides an overview of an image processing operation according to an embodiment of the invention.

In one embodiment of the invention, image processing operation 402 is specified as an object. Image processing operation 402 includes filter 404 that is a method of image processing operation 402. Filter 404 performs the actual image manipulation. Filter 404 uses source 406 as input and produces destination 408. When filter 404 operates within a color system, source 406 and destination 408 are instances of BufferedImage class 202. Source 406 and destination 408 are instances of Tile class 204 when filter 404 operates outside a color system. Source 406 and Destination 408 may or may not be the same object instance.

According to one or more embodiments of the invention, image processing operation 402 includes standard methods that are defined using the interface mechanism of the Java programming language. In the Java language, an interface is a collection of constants and abstract methods. A class can implement an interface by adding the interface to the class's "implements" clause. An abstract method can be overridden (i.e., replaced). A variable can be declared as an interface type and all of the constants and methods declared in the interface can be accessed from this variable.

Two interfaces used in embodiments of the invention are the TileOp interface and the BufferedImageOp interface. The BufferedImageOp interface describes single-input/single-output operations performed on instances of BufferedImage class 202. The TileOp interface describes single-input/single-output operations performed on instances of Tile class 204. The BufferedImageOp and TileOp interfaces can be implemented by object classes that, for example, perform transform, convolution, channel combination, and color system look up operations.

A BufferedImageOp interface is used for filtering operations performed within a color system. The BufferedImageOp interface includes filter 404 that identifies source 406 and destination 408 as BufferedImage objects. Filtering operations that are performed outside a color system use the TileOp interface. The TileOp interface includes filter 404 that identifies source 406 and destination 408 as instances of Tile object. Using the TileOp interface, filter 404 operates on raw data independent of a color system. Using the BufferedImageOp interface, filter 404 operates on data with a color system. In either case, filter 404 is therefore aware of whether it is operating inside or outside a color system.

Figure 5:
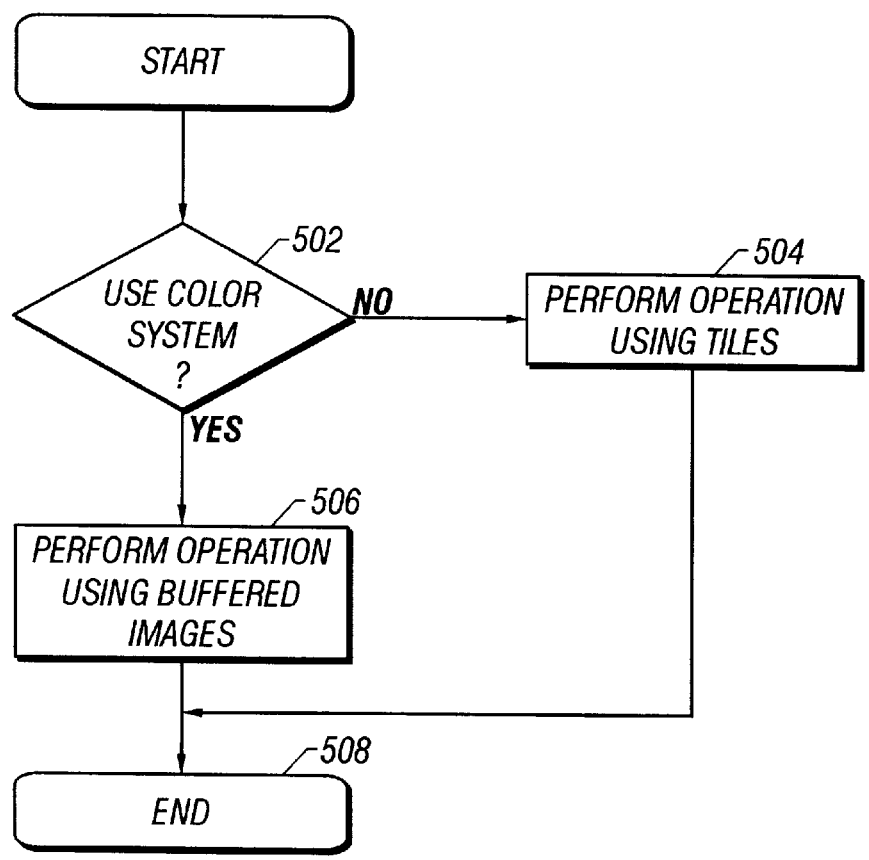
FIG. 5 illustrates an image processing flow according to an embodiment of the invention.

Filter 404 can operate on instances of BufferedImage class 202 or Tile class 204 as source 406 and destination 408. The determination of which instance type is used in the operation is made for each operation. FIG. 5 illustrates an image processing flow according to an embodiment of the invention.

At step 502, a determination is made whether filter 404 is performed within a color system or outside of a color system. If filter 404 is to be performed outside a color system, processing continues at step 504 to perform the operation using instances of Tile class 204 as source 406 and destination 408, and processing ends at step 508.

If it is determined at step 502 that filter 404 is to be performed with a color system, processing continues at step 506. Filter 404 is performed using instances of BufferedImage class 202.

Figure 6:
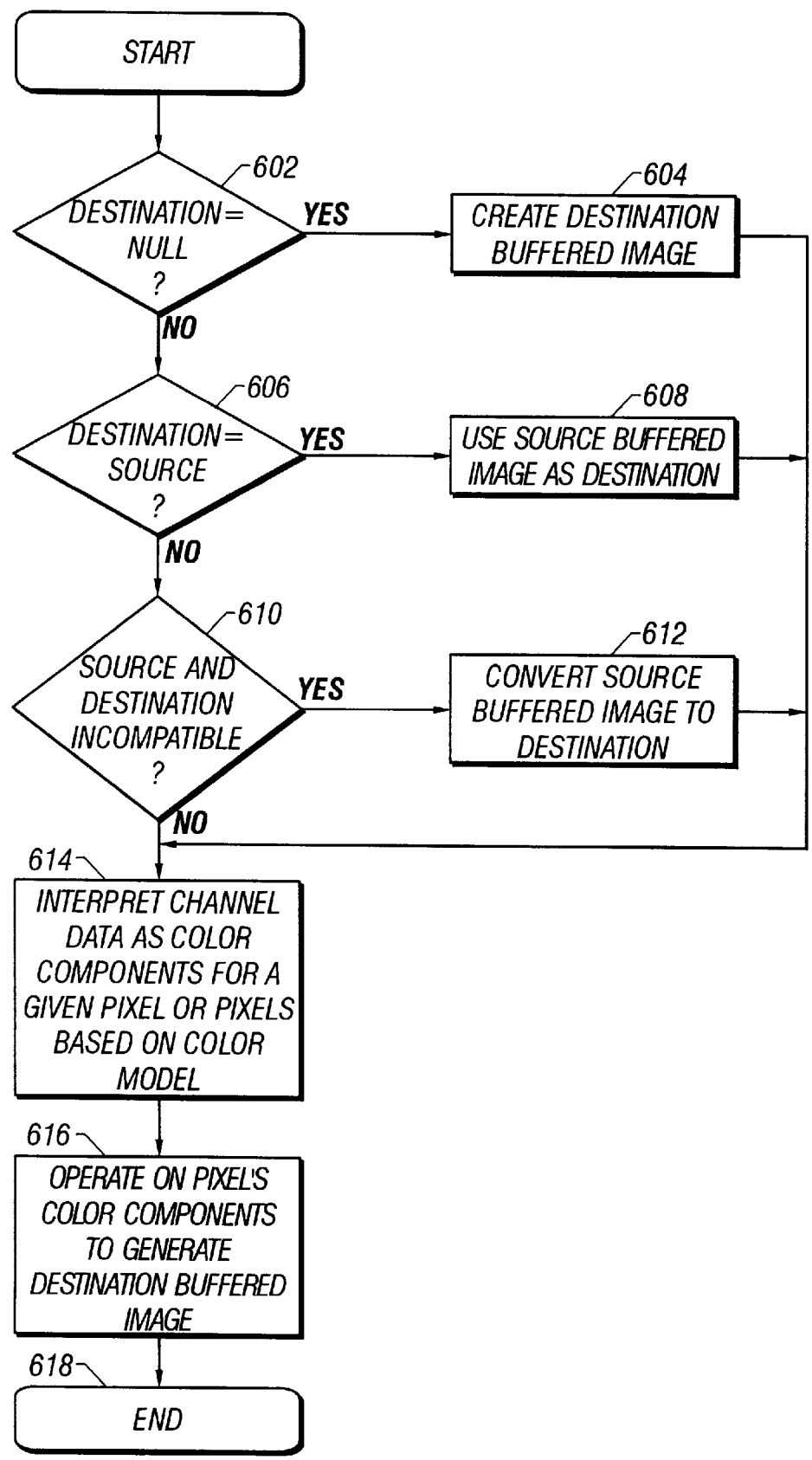
FIG. 6 illustrates an image processing flow within a color system according to an embodiment of the invention.

Thus, filter 404 can be performed using instances of Tile class 204 (as indicated in step 504) or instances of BufferedImage class 202 (as specified in step 506). Further, filter 404 can be performed by using the same instance as both source 406 and destination 408. That is, the results of filter 404 using source 406 as input are stored in source 406. Source 406 and destination 408 may be incompatible. For example, source 406 is associated with an RGB color system and destination 408 is associated with a CMYK color system. Thus, in performing filter 404 within a color system, some determinations must be made regarding source 406 and destination 408. FIG. 6 illustrates an image processing flow within a color system according to an embodiment of the invention.

At step 602, a determination is made whether the destination instance of BufferedImage class 202 has been specified (e.g., indicated as a null argument in the invocation of filter 404). If so, processing continues at step 604 to create a destination instance of BufferedImage class 202. An instance of ColorModel 206 is created and associated with the destination instance of BufferedImage class 202. Processing continues at step 614.

If it is determined at step 602 that a destination instance of BufferedImage class 202 was specified, processing continues at step 606 to determine whether the same instance of BufferedImage class 202 is being used as destination 408 and source 406. This is indicated at step 608 and processing continues at step 614.

At step 610, a determination is made whether the source and destination are compatible (e.g., source 406 and destination 408 have a compatible component size and number). If not, processing continues at step 612, to convert source 406 to be compatible with destination 408. For example, if source 406 is in the RGB color system, a conversion can be performed to the CMYK color system. The conversion can be performed via one or more intermediary color systems, if necessary. For example, source 406 can be converted to CIEXYZ before being converted to the color system associated with destination 408. Processing continues at step 614.

At step 614, the channel data is interpreted as color components for a given pixel based on the instance of ColorModel 206. As described in more detail below, various methods of ColorModel 206 can be used to extract color components for one pixel or an array of pixels. The instance of ColorModel 206 that is associated with source 406 identifies what each piece of raw data stored in one or more instances of Channel 208 represents in the color system. This information is used to construct the color components associated with one or more pixels from the instances of Channel 208 that are associated with source 406.

At step 616, the pixel data is operated on by filter 404 to generate the pixel data associated with destination 408. The instance of ColorModel 206 associated with destination 408 identifies how each color component of a pixel is stored in the instances of Channel 208 that are associated with destination 408. The information contained in the instance of ColorModel 206 is used to store the resulting color components associated with one or more pixels into the instances of Channel 208 that are associated with destination 408. If source 406 is the same as destination 408, the results of filter 404 are stored back in the instances of Channel 208 associated with source 406. Steps 614 and 616 can be repeated to perform filter 404 on every pixel that comprises source 406. Processing ends at step 618.

Figure 7:
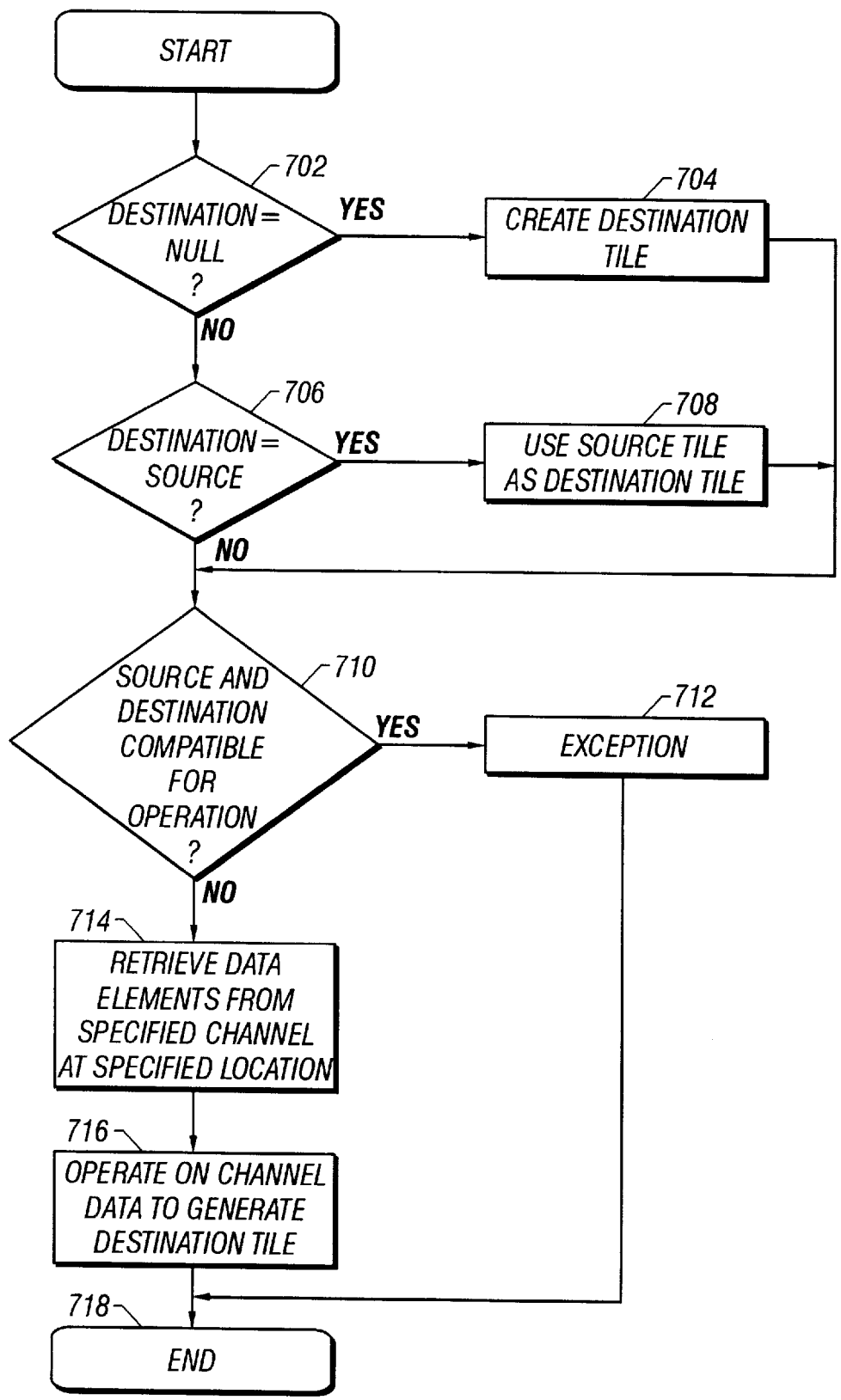
FIG. 7 illustrates a flow for performing an image processing operation outside a color system according to an embodiment of the invention.

Filter 404 can further be performed using instances of Tile class 204 (as indicated in step 504 of FIG. 5). Some determinations can be made regarding source 406 and destination 408 prior to performing filter 404. For example, filter 404 can be performed by using the same instance as both source 406 and destination 408. That is, the results of filter 404 using source 406 as input are stored in source 406. Further, source 406 and destination 408 may be incompatible for the type of operation performed by filter 404. These determinations can be performed prior to performing the operation of filter 404. FIG. 7 illustrates a flow for performing an image processing operation outside a color system according to an embodiment of the invention.

At step 702, a determination is made whether destination 408 is specified for filter 404. If not, processing continues at step 704 to create an instance of Tile 204 for destination 408, and processing continues at step 710. If destination 408 already exists processing continues at step 706 to determine whether source 406 is the same as destination 408. If so, processing continues at step 708 to use the same instance of Tile 204 for both source 406 and destination 408. Processing continues at step 710.

At step 710, processing continues to determine whether source 406 and destination 408 are invalid for use with filter 404 (e.g., invalid number and size of channels). If so, processing continues at step 712 to throw an exception and processing ends for the image processing operation at step 718. If not, processing continues at step 714.

At step 714, the data elements are retrieved from one or more instances of Channel 208 associated with the instance of Tile class 204 that is source 406. For example, a "getData" method can be invoked on Tile 204 to retrieve a channel element or an array of channel elements. The "getChannel" and "getChannels" methods of Tile class 204 can be used to retrieve a specified instances of Channel 208 or all instances of Channel 208, respectively.

At step 716, filter 404 is performed on the channel data to generate the instance of Tile 204 used as destination 408. If source 406 and destination 408 are the same, one instance of Tile 204 is used for both. Steps 714 and 716 can be performed for all of the data stored in the instances of Channel 208 associated with source 406.

The following provides a description of the BufferedImage, Tile, ColorModel object classes and the TileOp and BufferedImageOp interfaces according to one or more embodiments of the invention.

BufferedImage

BufferedImage class 202 is used to manipulate the pixels in an image within a color system. An instance of BufferedImage class 202 is created for an image. A BufferedImage instance is comprised of a ColorModel instance and a Tile instance. In so doing, the image data associated with an instance of BufferedImage 202 can be accessed as raw data via an instance of Tile 204 or color data via an instance of ColorModel 206. This provides more flexibility in the data layout and in the color systems that can be associated with the image.

BufferedImage class 202 includes instance variables that identify the width and height of the image and an image type. The image type can be used in an embodiment of the invention as a shortcut such as when a BufferedImage class instance is constructed. The Tile, Channel and ColorModel object classes contain the information associated with the data layout and specifics regarding the color system. Table 1 illustrates examples of image types that are used in embodiments of the invention.

TABLE 1

Image Type Examples

| Type | Description |
| --- | --- |
| TYPE_3BYTE_BGR | Image with 8-bit RGB color components with the colors Blue, Green, and Red stored in 3 bytes. |
| TYPE_4BYTE_ABGR | Image with 8-bit RGBA color components with the colors Blue, Green, and Red stored in 3 bytes and 1 byte of alpha not factored into the image data. |
| TYPE_4BYTE_ABGR_PRE | Image with 8-bit RGBA color components with the colors Blue, Green, and Red stored in 3 bytes and 1 byte of alpha that has been factored into the image data. |
| TYPE_BINARY | Opaque binary image with default black and white colors. |
| TYPE_BYTE_INDEXED | Opaque byte image with default 8-bit grayscale ramp. |
| TYPE_CUSTOM | A customized image other than the default image types. |
| TYPE_INT_ARGB | Image with 8-bit RGBA color components packed in an integer. The alpha component is not factored into the image data. |
| TYPE_INT_ARGB_PRE | Image with 8-bit RGBA color components packed in an integer. The alpha component is factored into the image data. |
| TYPE_INT_RGB | Image with 8-bit RGB color components packed in an integer. |
| TYPE_SHORT_INDEXED | Opaque short image with default 16-bit grayscale ramp. |

Table 1 contains examples of image types that can be used with embodiments of the invention. It should be apparent that other image types can be used including, but not limited to, image types that identify other color systems (such as YCC) and pixel depths. The example image types identify a color system (e.g., RGB) and specify the bit precision of the data. In addition, the example image types identify whether an alpha component is used and whether the alpha value is factored into the color components (i.e., pre-multiplied alpha).

For example, an image type of TYPE_INT_ARGB_PRE designates that an image uses the RGB color system and is defined using one channel of data. Each channel element contains the data for four components (i.e., red, green, blue and alpha) of a pixel. Further, the TYPE_INT_ARGB_PRE indicates that the alpha component is factored into the color components.

The image type can specify the bit precision of the data and whether or not the data is packed data. In an embodiment of the invention, the image data is stored as a data array. In the Java language, the data array is a collection of Java primitive types (e.g., byte, short, and int). A data array element is one primitive type datum from the data array for a channel. If the data is packed, there may be multiple channel elements stored in one data array element. In the case of the TYPE_INT_ARGB_PRE image type, there is one channel, each channel element is 32-bits, and a collection of four color components for a given x,y location (i.e., a pixel) is packed into an integer (e.g., a 32-bit "int" Java primitive type).

BufferedImage class 202 includes methods for retrieving information stored in the object. Table 2 provides examples of methods of BufferedImage class 202.

TABLE 2

Methods of BufferedImage

| Method Name | Modifier | Description |
| --- | --- | --- |
| getType | public | Returns the image type. If it is not one of the known types, TYPE_CUSTOM is returned |
| getColorModel | public | Returns the ColorModel object associated with the BufferedImage |
| getTile | public | Returns the Tile. |
| getChannel | public | Returns the specified channel |
| getChannels | public | Returns all channels. |
| getAlphaChannel | public | Returns the alpha channel. |
| getRGB | public | Returns an integer pixel in the default RGB color system and default sRGB color space. |
| getRGBArray | public | Returns an array of integer pixels in the default RGB color system and default sRGB color space. |
| setRGB | public | Set a pixel in a BufferedImage. |
| getWidth | public | Returns the width of the BufferedImage. |
| getHeight | public | Returns the height of the BufferedImage. |
| getSubimage | public | Returns a subimage given a rectangular region. The returned BufferedImage shares the same data array as the original image. |
| isAlphaPremultiplied | public | Returns whether or not the alpha has been premultiplied. |

The methods in Table 2 are examples of methods that can be defined for BufferedImage class 202. Other methods can be defined for BufferedImage instance 202 to supplement or replace those set forth in Table 2.

The methods of BufferedImage class 202 can be used to retrieve attributes of the image (e.g., getwidth, getHeight, getType and getColorModel). Methods of BufferedImage class 202 can be used to retrieve image data in a particular color system such as the default color system (e.g., getRGB). Other methods of BufferedImage class 202 can be used to retrieve image data a channel at a time (e.g., getchannel and getAlphaChannel) or all channels at one time (e.g., getChannels).

Tile

Tile class 204 is a collection of channels or storage bands of image data. Tile class 204 is comprised of an array of Channel objects as well as the tile's width and height, and starting location (e.g., an x and y offset within the image).

An instance of Tile 204 that is not associated with an instance of BufferedImage 202 can be associated with an arbitrary number of channels or bands of data. When the Tile instance is associated with a BufferedImage instance, the number of channels in the Tile's channel array correspond to the number of channels expected by the ColorModel instance.

A subset of the channels associated with a Tile instance can be associated with a subtile of the Tile instance. Referring to FIG. 3, for example, Tiles 314 and 324 are subtiles of Tile 304. Tile 304 has an array of channels that includes Channel instances 362–374. Tile 314 is comprised of a channel array that includes Channel instances 362, 364 and 366. Tile 324 is comprised of a channel array that includes Channel instances 368, 370, 372 and 374.

Tile class 204 is capable of holding information associated with a subtile including width, height, and data offsets of the subtile region. All subtiles have a base tile which is the topmost tile from which any subtile is created. The base tile of a tile that is not subtiled is itself. The data offsets are the same for all channels in a tile and are absolute pixel offsets into the channel data arrays (i.e., the offsets in a subtile are not relative to the offsets in a subtile's parent).

Tile class 304 includes methods including those set forth in Table 3.

TABLE 3

Tile Class Methods

| Method Name | Modifier | Description |
| --- | --- | --- |
| createCompatibleTile | public | Creates a tile with the same channel layout and the same or different width and height, and with zeroed data arrays |
| createSubtile | public | Creates a subtile given a region of the tile. |
| getBaseTile | public | Returns the base tile, which is the ancestor of the specified subtile whose parent is null. |
| getChannel | public | Returns the specified channel. |
| getChannel(s) | public | Returns all channels. |
| getData | public | Returns the channel element for the specified channel at the specified location. |
| getHeight | public | Returns the height of the specified channel. |
| getNumChannels | public | Returns the number of channels. |
| getWidth | public | Returns the width of the specified channel. |
| getXOffset | public | Returns the X coordinate of the offset into the channel data arrays. |
| getYOffset | public | Returns the Y coordinate of the offset into the channel data arrays. |
| putData | public | Stores the channel element for the specified channel, or all channels, at the specified location. |

The methods identified in Table 3 are by way of example only. Other methods can be defined for Tile instance 204 to supplement or replace those set forth in Table 3.

The methods of Tile class 204 can be used to retrieve attributes of a Tile instance and the channels associated with the Tile instance (e.g., getwidth, getHeight, getXOffset, getNumChannels and getYOffset). Methods of Tile class 204 can be used to access channel data (e.g., getData and putData). Other methods of Tile class 204 can be used to retrieve data a channel at a time (e.g., getChannel) or all channels at one time (e.g., getChannels). Another instance of Tile 204 can be created using the createCompatibleTile method. A subtile of an instance of Tile 204 can be created with the createSubtile method.

ColorModel

ColorModel class 206 encapsulates the state and methods to convert a pixel of data into color components (e.g., red, green and blue) of a particular color system. A pixel is a collection of channel elements for a given x,y location of an image.

ColorModel class 206 specifies the color system of the data identified by Tile class 204 and how the data is mapped to color and alpha components. This includes mapping components in the data channels of an image to components of a particular color system. In one or more embodiments, ColorModel class 206 further includes the ability to extract pixel components from packed pixel data, retrieving multiple components from a single data channel using masks, and converting pixel data through a lookup table.

Subclasses of ColorModel class 206 can be defined for specific color systems. For example, an IndexColorModel class contains a lookup table that maps an index to a color.

An IndexColorModel can be associated with a Tile that has either one or two Channel objects. One channel contains the index to the table and the other is an alpha channel.

A ComponentColorModel class is associated with a Tile that has the same number of Channel objects as color and alpha components in the ComponentColorModel. The placement of color component names in the color system determines the mapping between color components and channels in the array of Channel objects. For example, a color system with an RGB color system would map red to the channel at index 0, green to the channel at index 1, and blue to the channel at index 2. If there is an alpha channel, it would be the last channel in the channel array, the channel at index 3.

A PackedColorModel class is associated with a Tile that has one DiscreteChannel object. The packing information that describes how color and alpha components are extracted from the channel is stored in the PackedColorModel.

Table 4 identifies methods defined for ColorModel class 206.

TABLE 4

ColorModel Class Methods

| Method Name | Modifier | Description |
| --- | --- | --- |
| createCompatibleTile | public | Creates a Tile with the specified width and height, that has a channel layout compatible with the ColorModel instance |
| getAlpha | public | Returns the alpha component for the specified pixel, scaled from 0 to 255 in the default RGB ColorSpace, sRGB. |
| getBlue | public | Returns the blue color component for the specified pixel, scaled from 0 to 255 in the default RGB ColorSpace, sRGB. |
| getColorSpace | public | Returns the ColorSpace associated with this ColorModel. |
| getGreen | public | Returns the green color component for the specified pixel. scaled from 0 to 255 in the default RGB ColorSpace, sRGB. |
| getNumColorComponents | public | Returns the number of components (excluding alpha) in the ColorModel instance. |
| getNumComponents | public | Returns the number of components (including alpha) in the ColorModel instance. |
| getPixelSize | public | Returns the number of bits per pixel. |
| getRed | public | Returns the red color component for the specified pixel. scaled from 0 to 255 in the default RGB ColorSpace, sRGB. |
| getRGB | public | Returns a pixel in the default RGB color system given a pixel array in the current color system. |
| hasAlpha | public | Returns whether or not alpha is supported in this ColorModel. |
| isAlphaPreMultiplied | public | Returns whether or not the alpha has been premultiplied in the Tile associated with this ColorModel. |

The methods identified in Table 4 are by way of example only. Other methods can be defined for ColorModel instance 206 to supplement or replace those set forth in Table 4.

The methods of ColorModel class 206 can be used to retrieve color components for a given location within the image (e.g., getAlpha, getRed, getGreen, getBlue and getRGB). Attributes of a ColorModel instance can be retrieved using methods of ColorModel class 206 (e.g., getNumComponents, getColorSpace, getPixelSize and getNumColorComponents). A createCompatibleTile method of ColorModel class 206 can be used to create an instance of Tile 204.

BufferedImageOp

The BufferedImageOp interface describes single-input/single-output operations performed on BufferedImage objects. The BufferedImageOp interface is implemented by object classes that perform image processing or filtering operations such as transformation, convolution, combination, conversion, scaling, threshold and lookup operations. Each class can specify whether it allows an "in place" filtering operation (i.e., the source object is equal to the destination object). Table 5 identifies methods defined for the BufferedImageOp interface.

TABLE 5

BufferedImageOp Interface Methods

| Method Name | Modifier | Description |
| --- | --- | --- |
| createCompatibleDestImage | public | Creates an empty destination image with the correct size and number of components. |
| filter | public | Perform a single-input/single-output operation on a BufferedImage. If the color systems for the two images (i.e., source and destination images) do not match, a color conversion into the destination color system is performed. If the destination image is null, a BufferedImage with an appropriate ColorModel is created. |
| getDestBounds | public | Returns the bounding box of the filtered destination image. |
| getDestPoint | public | Returns the location of the destination point given a point in the source image. |

The methods identified in Table 5 are examples of methods defined for the BufferedImageOp interface. Other methods can be defined for the BufferedImageOp interface to supplement or replace those set forth in Table 5.

The methods of the BufferedImageOp interface can be used to create a new instance of BufferedImage class 202 that is used as destination 408. The affected area of destination 408 can be retrieved using the getDestBounds method. The filter method performs the image processing operation on source 406 (e.g., an instance of BufferedImage class 202).

TileOp

The TileOp interface describes single-input/single-output operations performed on tile objects. The TileOp interface is implemented by object classes that perform image processing or filtering operations such as transformation, convolution, combination, conversion, scaling, threshold and lookup operations. Each class can specify whether it allows an "in place" filtering operation (i.e., the source object is equal to the destination object). Table 6 identifies methods defined for the TileOp interface.

TABLE 6

TileOp Interface Methods

| Method Name | Modifier | Description |
| --- | --- | --- |
| createCompatibleDestTile | public | Creates an empty destination tile with the correct size and number of channels. |

TABLE 6-continued

TileOp Interface Methods

| Method Name | Modifier | Description |
| --- | --- | --- |
| filter | public | Perform a single-input/single-output operation from a source Tile to a destination Tile. If the destination Tile does not exist, a new Tile is created. |
| getDestBounds | public | Returns the bounding box of the filtered destination Tile. |
| getDestPoint | public | Returns the location of the destination point given a point in the source tile. |

The methods identified in Table 6 are examples of methods defined for the TileOp interface. Other methods can be defined for the TileOp interface to supplement or replace those set forth in Table 6.

The methods of the TileOp interface can be used to create a new instance of Tile class 204 that is used as destination 408. The affected area of destination 408 can be retrieved using the getDestBounds method. The filter method performs the image processing operation on source 406 (e.g., an instance of Tile class 204).

Thus, a method and apparatus for separating image data from a color system in image processing has been provided in conjunction with one or more specific embodiments. The invention is defined by the claims and their full scope of equivalents.

What is claimed is:

1. A system for separating image data from a color system in image processing comprising:
 a data source having a plurality of channels of raw data for an image, said plurality representing a number, said number being independent of any particular color system, wherein each of said plurality of channels of raw data comprises pixel data for said image;
 a buffered-image object having a buffer of information regarding said image in a desired color system, said desired color system being selected from a plurality of color systems, each of said plurality of color systems requiring a number of channels not greater than said plurality of channels of raw data, said buffer of information including type, height, and width of said image, said type defining which subset of said plurality of channels of raw data are used for said desired color system and the manner of storage of said raw data in said channels and definition of said desired color system;
 a tile object associated with said buffered-image object, said tile object providing a capability to perform image operations, which are outside of said desired color system, on said raw data using said subset of said plurality of channels;
 a color model object associated with said buffered-image object, said color model object providing capability for color operations within said desired color system.

2. The system of claim 1 further comprising an image processing module configured to operate on a source to produce a destination, said source and said destination being instances of said tile module.

3. The system of claim 1 further comprising an image processing module configured to operate on a source to produce a destination, said source and said destination being instances of said image module when said image processing module operates on said color components.

4. The system of claim 1 wherein said tile module is a child of a parent tile module, said child module comprising a subset of the channels of raw image data of said parent tile module.

5. A method of separating raw image data from a color system comprising:
 obtaining a data source having a plurality of channels of raw data for an image, said plurality representing a number, said number being independent of any particular color system, wherein each of said plurality of channels of raw data comprises pixel data for said image;
 selecting a desired color system from a plurality of color systems for processing said raw data, said desired color system requiring a number of channels not greater than said plurality of channels of raw data;
 creating a buffered-image object having a buffer of information regarding said image in said desired color system, said buffer of information including type, height, and width of said image, said type defining which subset of said plurality of channels of raw data are used for said desired color system and the manner of storage of said raw data in said channels and definition of said desired color system;
 creating a tile object associated with said buffered-image object, said tile object providing a capability to perform image operations, which are outside of said desired color system, on said raw data using said subset of said plurality of channels;
 creating a color model object associated with said buffered-image object, said color model object providing capability for color operations within said desired color system.

6. The method of claim 5 further comprising an image processing operation performed outside of a color system, said image processing operation comprising:
 creating a destination tile object, if a destination tile object does not exist;
 accessing said tile object to retrieve an item of raw image data from said one or more channel objects;
 performing said image processing operation on said item of raw image data to generate a modified item of raw image data;
 accessing said destination tile object to store said modified item of raw image data.

7. The method of claim 6 wherein said creating a destination tile object further comprises:
 identifying said tile object as said destination tile object.

8. The method of claim 5 further comprising an image processing operation performed within a color system, said image processing operation comprising:
 creating a destination image object;
 accessing said image object to retrieve an item of color data;
 performing said image processing operation on said item of color data to generate a modified color data item;
 accessing said destination image object to store said modified color data item.

9. The method of claim 8 wherein said accessing said image object to retrieve further comprises:
 retrieving an item of raw image data;
 accessing said color model object associated with said image object to interpret said item of raw image data as a component of said color system.

10. The method of claim 8 wherein said accessing said image object to store further comprises:

accessing said color model object associated with said image object to interpret said modified color data item as raw image data;

storing said modified color data item as raw image data.

11. The method of claim 8 wherein said creating a destination image object further comprises:

identifying said image object as said destination image object.

12. The method of claim 5 further comprising:

creating a plurality of additional channel objects that are associated with a plurality of additional bands of raw image data;

creating a parent tile object, said parent tile object providing operations for retrieving raw image data from said channel object and said plurality of additional channel objects;

identifying said tile object as a subtile of said parent tile object.

13. The method of claim 12 further comprising:

creating a second image object, said second image object is associated with said parent tile object;

creating a second color model object associated with said second image object, said second color model object providing operations to interpret said raw image data as color components of a second color system.

14. An article of manufacture comprising:

a computer usable medium having computer readable program code embodied therein for separating raw image data from a color system comprising:

computer readable program code configured to cause a computer to obtain a data source having a plurality of channels of raw data for an image, said plurality representing a number, said number being independent of any particular color system, wherein each of said plurality of channels of raw data comprises pixel data for said image;

computer readable program code configured to cause a computer to select a desired color system from a plurality of color systems for processing said raw data, said desired color system requiring a number of channels not greater than said plurality of channels of raw data;

computer readable program code configured to cause a computer to create a buffered-image object having a buffer of information regarding said image in said desired color system, said buffer of information including type, height, and width of said image, said type defining which subset of said plurality of channels of raw data are used for said desired color system and the manner of storage of said raw data in said channels and definition of said desired color system;

computer readable program code configured to cause a computer to create a tile object associated with said buffered-image object, said tile object providing a capability to perform image operations, which are outside of said desired color system, on said raw data using said subset of said plurality of channels;

computer readable program code configured to cause a computer to create a color model object associated with said buffered-image object, said color model object providing capability for color operations within said desired color system.

15. The article of manufacture of claim 14 further comprising an image processing operation performed outside of a color system, said article of manufacture further comprising:

computer readable program code configured to cause a computer to create a destination tile object, if a destination tile object does not exist;

computer readable program code configured to cause a computer to access said tile object to retrieve an item of raw image data from said one or more channel objects;

computer readable program code configured to cause a computer to perform said image processing operation on said item of raw image data to generate a modified item of raw image data;

computer readable program code configured to cause a computer to access said destination tile object to store said modified item of raw image data.

16. The article of manufacture of claim 15 wherein said computer readable program code configured to cause a computer to create a destination tile object further comprises:

computer readable program code configured to cause a computer to identify said tile object as said destination tile object.

17. The article of manufacture of claim 14 further comprising an image processing operation performed within a color system, said article of manufacture further comprising:

computer readable program code configured to cause a computer to create a destination image object;

computer readable program code configured to cause a computer to access said image object to retrieve an item of color data;

computer readable program code configured to cause a computer to perform said image processing operation on said item of color data to generate a modified color data item;

computer readable program code configured to cause a computer to access said destination image object to store said modified color data item.

18. The article of manufacture of claim 17 wherein said computer readable program code configured to cause a computer to access said image object to retrieve further comprises:

computer readable program code configured to cause a computer to retrieve an item of raw image data;

computer readable program code configured to cause a computer to access said color model object associated with said image object to interpret said item of raw image data as a component of said color system.

19. The article of manufacture of claim 17 wherein said computer readable program code configured to cause a computer to access said image object to store further comprises:

computer readable program code configured to cause a computer to access said color model object associated with said image object to interpret said modified color data item as raw image data;

computer readable program code configured to cause a computer to store said modified color data item as raw image data.

20. The article of manufacture of claim 17 wherein said computer readable program code configured to cause a computer to create a destination image object further comprises:

computer readable program code configured to cause a computer to identify said image object as said destination image object.

21. The article of manufacture of claim 14 further comprising:

computer readable program code configured to cause a computer to create a plurality of additional channel objects that are associated with a plurality of additional bands of raw image data;

computer readable program code configured to cause a computer to create a parent tile object, said parent tile object providing operations for retrieving raw image data from said channel object and said plurality of additional channel objects;

computer readable program code configured to cause a computer to identify said tile object as a subtile of said parent tile object.

22. The article of manufacture of claim 21 further comprising:

computer readable program code configured to cause a computer to create a second image object, said second image object is associated with said parent tile object;

computer readable program code configured to cause a computer to create a second color model object associated with said second image object, said second color model object providing operations to interpret said raw image data as color components of a second color system.

23. A computer data signal embodied in a carrier wave and representing sequences of instructions which, when executed by a processor, cause said processor to separate raw image data from a color system by performing:

obtaining a data source having a plurality of channels of raw data for an image, said plurality representing a number, said number being independent of any particular color system, wherein each of said plurality of channels of raw data comprises pixel data for said image;

selecting a desired color system from a plurality of color systems for processing said raw data, said desired color system requiring a number of channels not greater than said plurality of channels of raw data;

creating a buffered-image object having a buffer of information regarding said image in said desired color system, said buffer of information including type, height, and width of said image, said type defining which subset of said plurality of channels of raw data are used for said desired color system and the manner of storage of said raw data in said channels and definition of said desired color system;

creating a tile object associated with said buffered-image object, said tile object providing a capability to perform image operations, which are outside of said desired color system, on said raw data using said subset of said plurality of channels;

creating a color model object associated with said buffered-image object, said color model object providing capability for color operations within said desired color system.

24. The computer data signal of claim 23 further comprising an image processing operation performed outside of a color system, said sequences of instructions which, when executed by a processor, cause said processor to further perform:

creating a destination tile object, if a destination tile object does not exist;

accessing said tile object to retrieve an item of raw image data from said one or more channel objects;

performing said image processing operation on said item of raw image data to generate a modified item of raw image data;

accessing said destination tile object to store said modified item of raw image data.

25. The computer data signal of claim 24 wherein said creating a destination tile object further comprises:

identifying said tile object as said destination tile object.

26. The computer data signal of claim 23 further comprising an image processing operation performed within a color system, said sequences of instructions further comprise:

creating a destination image object;

accessing said image object to retrieve an item of color data;

performing said image processing operation on said item of color data to generate a modified color data item;

accessing said destination image object to store said modified color data item.

27. The computer data signal of claim 26 wherein said accessing said image object to retrieve further comprises:

retrieving an item of raw image data;

accessing said color model object associated with said image object to interpret said item of raw image data as a component of said color system.

28. The computer data signal of claim 26 wherein said accessing said image object to store further comprises:

accessing said color model object associated with said image object to interpret said modified color data item as raw image data;

storing said modified color data item as raw image data.

29. The computer data signal of claim 26 wherein said creating a destination image object further comprises:

identifying said image object as said destination image object.

30. The computer data signal of claim 23, wherein said sequences of instructions which, when executed by a processor, cause said processor to perform:

creating a plurality of additional channel objects that are associated with a plurality of additional bands of raw image data;

creating a parent tile object, said parent tile object providing operations for retrieving raw image data from said channel object and said plurality of additional channel objects;

identifying said tile object as a subtile of said parent tile object.

31. The computer data signal of claim 30, wherein said sequences of instructions which, when executed by a processor, cause said processor to perform:

creating a second image object, said second image object is associated with said parent tile object;

creating a second color model object associated with said second image object, said second color model object providing operations to interpret said raw image data as color components of a second color system.

* * * * *